J. R. NAYLOR.
COMBINED SPRING AND SPIKE TOOTH HARROW.
APPLICATION FILED APR. 26, 1907.
901,118.
Patented Oct. 13, 1908.
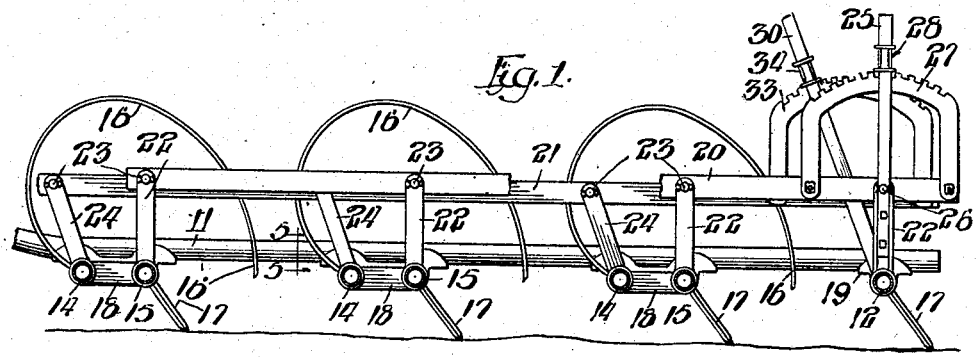
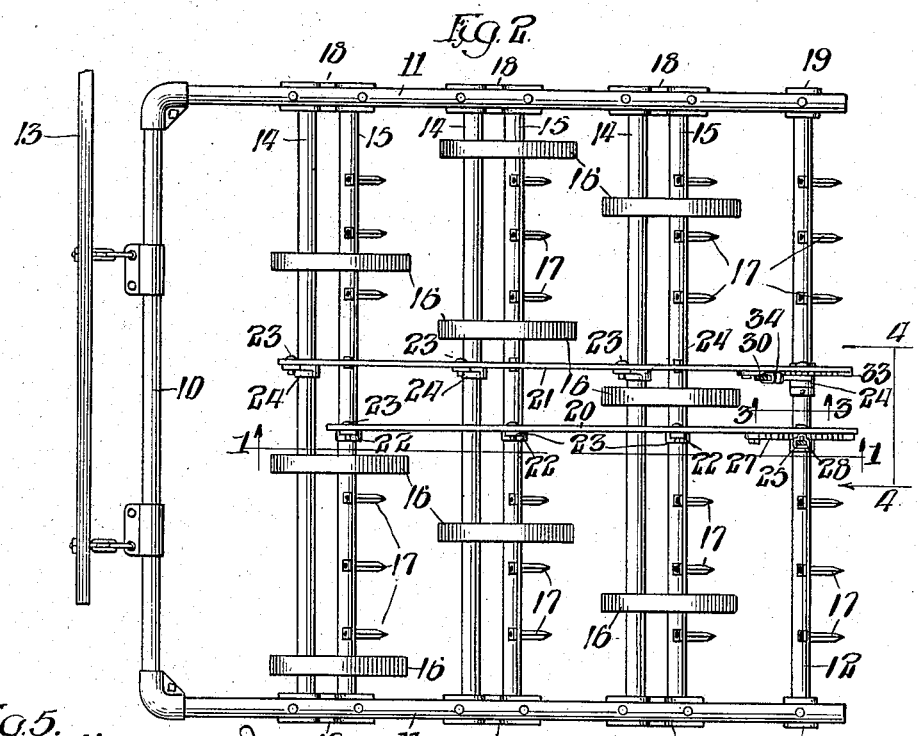
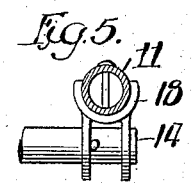
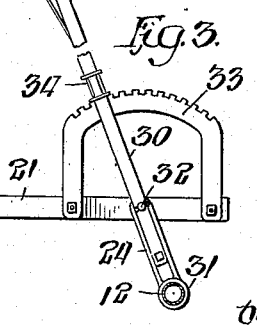
Witnesses:
Inventor
Jonathan R. Naylor
by Poole & Brown Attys.

UNITED STATES PATENT OFFICE.

JONATHAN R. NAYLOR, OF LA GRANGE, ILLINOIS.

COMBINED SPRING AND SPIKE TOOTH HARROW.

No. 901,118.　　　　　Specification of Letters Patent.　　　　Patented Oct. 13, 1908.

Application filed April 26, 1907. Serial No. 370,486.

*To all whom it may concern:*

Be it known that I, JONATHAN R. NAYLOR, a citizen of the United States, and a resident of La Grange, in the county of Cook and State of Illinois, have invented certain new and useful Improvements in a Combined Spring and Spike Tooth Harrow; and I do hereby declare that the following is a full, clear, and exact description thereof, reference being had to the accompanying drawings, and to the letters of reference marked thereon, which form a part of this specification.

This invention relates to improvements in combined spring and spike tooth harrows and the invention consists in the matters hereinafter set forth and more particularly pointed out in the appended claims.

Among the objects of my invention is to provide a harrow of the type mentioned which is so constructed and arranged that it may be adjusted to bring into action upon the soil both sets of teeth at varying depths of penetration or may be adjusted so as to bring into action either set of said teeth.

In the drawings:—Figure 1 is a vertical longitudinal section of a harrow made in accordance with my invention taken on line 1—1 of Fig. 2. Fig. 2 is a partial top plan view thereof. Fig. 3 is a detail section, taken on line 3—3 of Fig. 2. Fig. 4 is a detail section, taken on line 4—4 of Fig. 2. Fig. 5 is a section, taken on line 5—5 of Fig. 1.

As shown in the drawings, the frame of the harrow comprises a front bar 10, side bars 11 rigidly secured together, and a rear bar 12. In Fig. 2 is shown but a single section of a harrow, but it will be understood that two or more sections may be secured together by a single draft-bar 13 in a familiar manner.

14 and 15 designate cross-bars extending transversely between the side members of the frame. As herein shown, the said bars are arranged in pairs. As herein shown, three pairs of such bars are employed. The bars 14 carry spring teeth 16 while the bars 15 carry spike teeth 17. The rear bar of the harrow is a spike tooth bearing bar, it being desirable that the finishing work of the harrow shall be accomplished by the spike teeth 17.

The spring and spike tooth bearing bars 14 and 15 are rotatively mounted in brackets 18 attached to and depending from the side frame members 11, each of said brackets being rigidly fixed to its side frame by bolts (Fig. 5) and provided with two openings in which the bars 14 and 15 are mounted in a manner to have a rocking movement therein. The rear bar 12 is also rockingly mounted at its ends in brackets 19 attached to and depending from the side frame members.

20 and 21 designate connecting bars or links which extend transversely across the spring and spike tooth bars from front to rear of the harrow section. The bar 20 is loosely connected with the upper ends of arms 22, 22 which are fixed non-rotatively to the spike tooth bearing bars and extend upwardly therefrom. The connection of the upper ends of said arms 22 with the connecting bar 20 comprises pins 23 extending through the said bar and arms and fixed in place by cotter-pins, as shown in Fig. 1. The spring tooth bearing bars 15 are likewise provided with non-rotatively connected, upwardly extending arms 24 which are, in a like manner, loosely connected at their upper ends with the connecting bar 21.

25 designates a forwardly and rearwardly swinging adjusting lever for the spike tooth bearing bars 15. Said lever 25 is non-rotatively fixed at its lower end to the rearmost spike tooth bearing bar 12 and is loosely connected between its ends by means of a pin 26 with the connecting bar 20.

27 designates a notched segment fixed to the connecting bar 20 at one side of the adjusting lever 25, and said adjusting lever is provided with a movable pawl or detent 28 which engages the notches or teeth of said segment to hold the lever 25 and the spike teeth adjusted thereby in any adjusted position desired.

30 designates a forwardly and rearwardly swinging adjusting lever for the spring teeth bearing bars 14 which is hinged at its lower end to the rearmost spike tooth bar 12 between collars 31, 31 fixed thereon. The said lever 30 is connected with the connecting bar 21 for the spring tooth bearing bars by means of a pin 32, as best shown in Figs. 3 and 4.

33 designates a notched segment that is fixed to the connecting bar 21 at the side of the lever 30, and the lever 30 is provided with a movable detent 34 adapted to engage the teeth or notches of said notched segment to hold the bar 30 and the spring teeth in any adjusted position desired.

It will be observed that the adjusting levers 25 and 30 operate independently of each other, whereby either lever may be set to adjust the set of teeth with which it is connected without changing the adjustment of the other set of teeth. For instance, if the lever 25 be thrown backwardly from the position shown in Fig. 1, the spike teeth will be set to penetrate the soil more deeply than in the position shown in said Fig. 1. On the other hand, if the said lever 25 be swung forwardly the said spike teeth will be set at greater inclination to the soil and thus penetrate the soil to a less depth. By swinging the lever 30 rearwardly from the position shown, the spring teeth may be swung down in position to penetrate the soil and it will be observed that such adjustment of the spring teeth to the soil will be effected without in any manner affecting the action of the spike teeth on the soil. Furthermore, it will be observed that the spring teeth, by proper manipulation of the adjusting lever 30, may be adjusted to penetrate deeply into the soil while the spike teeth may be thrown entirely out of the soil. Thus I am enabled by the mechanism described to operate the harrow either as a spring or spike tooth harrow and to adjust either set of teeth to various depths, or I may operate the harrow as a combined spring and spike tooth harrow and at the same time am able to vary the depth of penetration of one or both sets of teeth, the adjustment of one set of teeth being independent of the adjustment of the other teeth.

I claim as my invention:—

1. A harrow comprising a frame, a plurality of rocking bars extending across the frame and mounted in bearings carried by the side members of the frame, said bars being arranged in sets, one set bearing spring teeth and the other set bearing spike teeth, means acting on the spike teeth bearing bars for adjusting the spike teeth to the soil, and means acting on the spring teeth bearing bars for adjusting the spring teeth to the soil, said adjusting means permitting the two sets of teeth to be adjusted for simultaneous or independent use, and to penetrate the soil at varying depths, either when used singly or combined.

2. A harrow comprising a frame, a plurality of parallel closely spaced rocking bars mounted in bearings carried by the side members of said frame, said bars being arranged in sets, one set bearing spring teeth and the other set bearing spike teeth, the bars of each set being arranged alternately to the bars of the other set, adjusting means connected with all of the bars of one set for rocking them in unison, and separate adjusting means likewise connected with all of the bars of the other set, whereby the two sets of teeth may be adjusted for simultaneous or independent use, and to penetrate the soil either when used singly or together at varying depths.

In testimony, that I claim the foregoing as my invention I affix my signature in the presence of two witnesses, this 20th day of April A. D. 1907.

JONATHAN R. NAYLOR.

Witnesses:
WILLIAM L. HALL,
GEORGE R. WILKINS.